Sept. 11, 1923.

A. W. SIZER 1,467,883

MACHINE FOR COMPRESSING OR MOLDING PLASTIC SUBSTANCES

Filed Aug. 7, 1922   3 Sheets-Sheet 1

Inventor:
Albert William Sizer.
By R. W. O. Thompson,
Atty.

Patented Sept. 11, 1923.

1,467,883

UNITED STATES PATENT OFFICE.

ALBERT WILLIAM SIZER, OF HESSLE, ENGLAND.

MACHINE FOR COMPRESSING OR MOLDING PLASTIC SUBSTANCES.

Application filed August 7, 1922. Serial No. 580,211.

*To all whom it may concern:*

Be it known that I, ALBERT WILLIAM SIZER, a subject of the King of Great Britain, residing at Hessle, in the county of York and Kingdom of England, have invented certain new and useful Improvements in Machines for Compressing or Molding Plastic Substances (for which I have filed application in England, No. 20,531, dated August 2, 1921), of which the following is a specification.

The present invention relates to an improved machine for compressing or molding plastic substances and is particularly suitable for compressing or molding seed, meal or the like for use as cattle food.

The apparatus however will be largely applicable for other molding purposes.

According to the present invention, meal to be compressed or moulded is fed to the space between one or more rollers or runners, and the inner periphery of a drum contacting with them, the meal being then forced through radial passages in either runners or peripheral drum or both.

The invention will be more particularly described with reference to the accompanying drawings, in which:—

Figure 1:
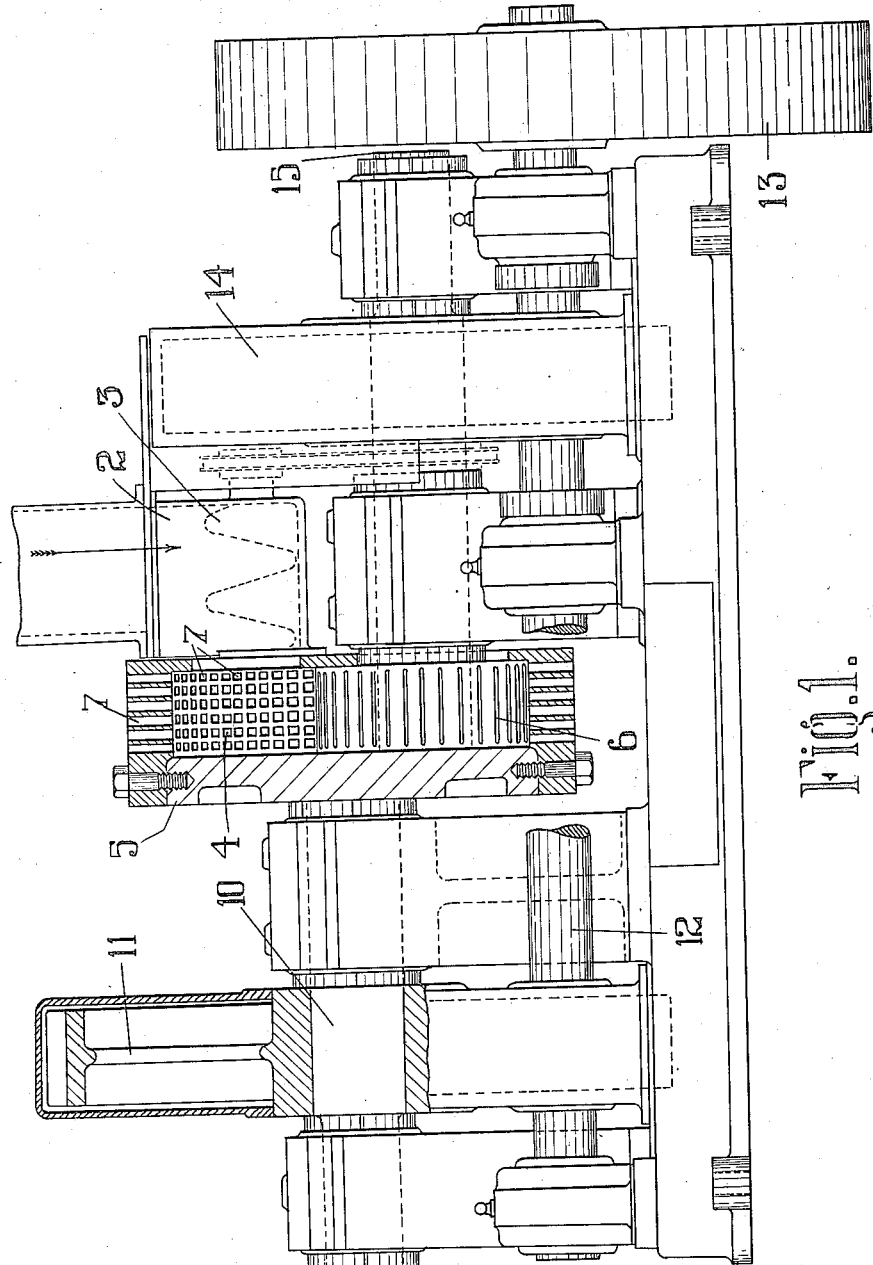
Figure 1 is an elevation partly in section of one form of construction.
Figure 2:
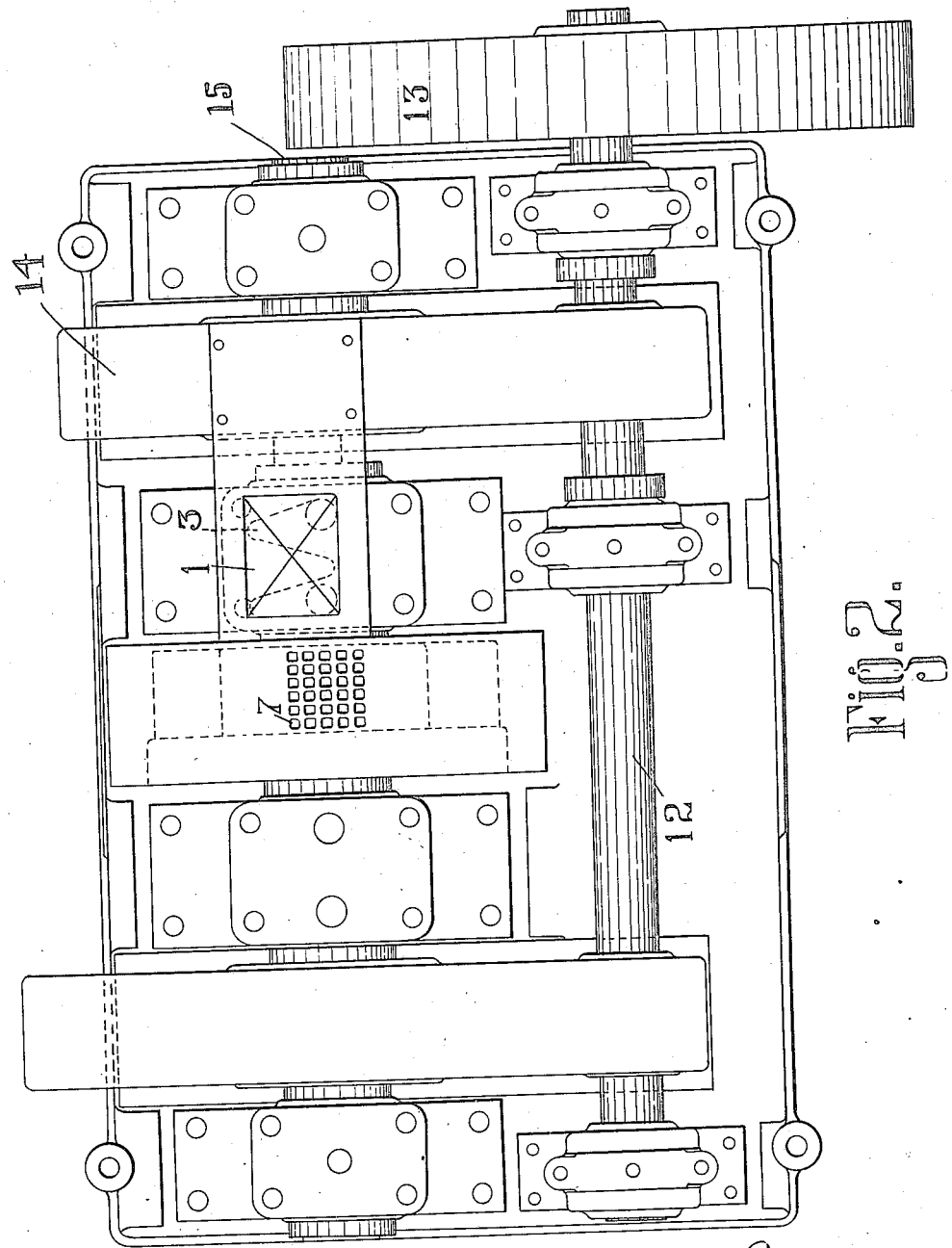
Figure 2 is a corresponding plan view.

Meal is fed from a hopper or the like down a chute 1, to a chamber 2, where it is forced by means of a conveyor worm 3, or other suitable device into the space 4, between the external hollow cylindrical drum 5, and the internal roller 6, rotating relatively to one another. In the construction shown, both the drum 5, and roller 6, are positively driven, but one only of these if desired, can be driven.

Figure 3:
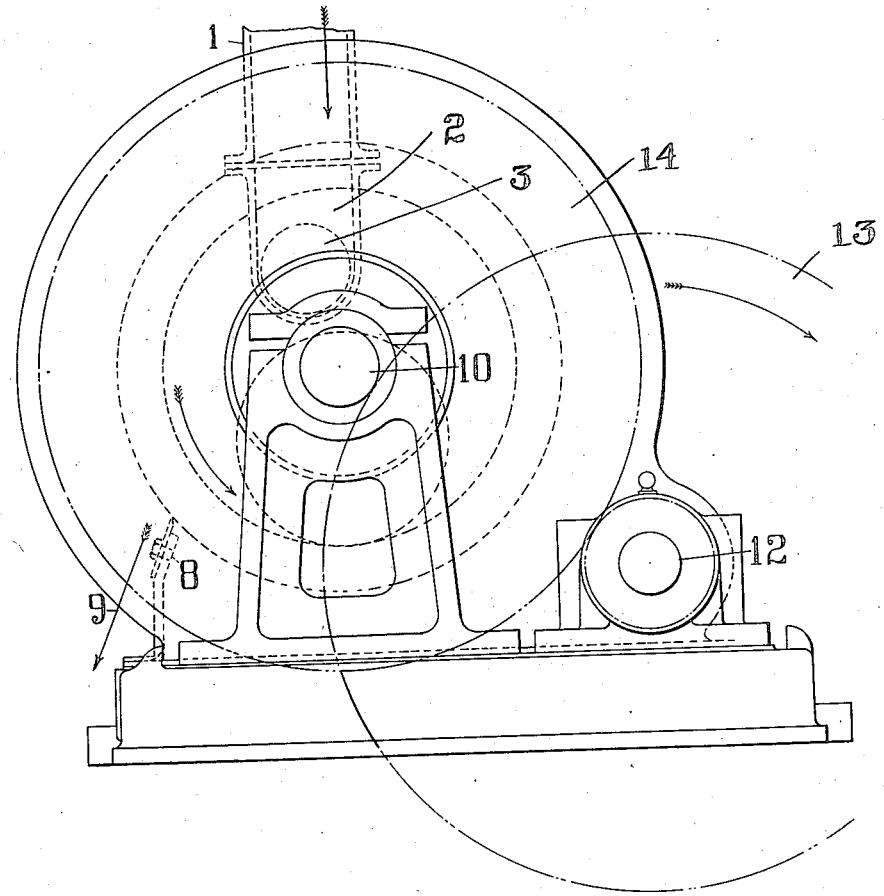
Figure 3 is an end view.

The hollow drum 5, is formed with radial peripheral passages 7, which may have if desired cross sections to give the extruded cake the shape desired. This drum further co-operates with a scraper blade 8 (Fig. 3) which allows the extruded cake to fall away in the form of short sections in the direction of the arrow 9.

The cylindrical drum 5, is mounted on a shaft 10 carrying a gear wheel 11, driven from a main shaft 12, having also a pulley 13, receiving its motion from any source of power. This shaft also carries a pinion driving a gear wheel 14, on a shaft 15, to which is keyed the roller 6. This roller 6 may have a fluted surface as desired. Also in certain cases it may be provided with teeth to intermesh with teeth on the inside surface of the drum 5.

In certain cases it will be desirable to give the roller 6, a slightly higher or slower peripheral velocity than the internal surface of the drum 5. This can obviously be effected by suitably selecting the ratios of gear.

The passages 7, are shown truly radial but these can be deflected axially or otherwise as desired.

I declare that what I claim is:—

1. A machine for molding plastic substances comprising a drum perforated radially to provide moulds, a roller contacting with the inner periphery of said drum, means to feed the meal to the space between the said roller and the said drum, and means to rotate said drum to extrude all the material fed into said space through said radial moulds.

2. A machine for molding plastic substances comprising a drum perforated radially to provide moulds, a roller contacting with the inner periphery of said drum, means to feed the meal to the space between the said roller and the said drum, means to rotate said drum to extrude all the material fed into said space through said radial moulds, and a stationary knife adjacent to the outer surface of the drum to remove the extruded meal in the form of cakes.

3. A machine for molding plastic substances comprising a drum perforated radially to provide moulds, a roller contacting with the inner periphery of said drum, means to feed the meal to the space between the said roller and the said drum, means to rotate said drum to extrude all the material fed into said space through said radial moulds, and means to drive the roller and drum at different peripheral speeds.

4. A machine for molding plastic substances comprising a drum perforated radially to provide moulds, a roller contacting with the inner periphery of said drum, means to feed the meal to the space between the said roller and the said drum, means to rotate said drum to extrude all the material fed into said space through said radial moulds, and means to drive the roller and gearing between said roller and said drum so that the drum also is positively driven.

In witness whereof, I have hereunto signed my name this 26th day of July, 1922, in the presence of two subscribing witnesses.

ALBERT WILLIAM SIZER.

Witnesses:
ALBERT W. SCOTT,
RUPERT HENRY BRADFIELD.